United States Patent
Liu

(10) Patent No.: US 11,962,446 B2
(45) Date of Patent: Apr. 16, 2024

(54) METHOD AND APPARATUS FOR CONFIGURING PHYSICAL RANDOM ACCESS CHANNEL

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 17/769,315

(22) PCT Filed: Oct. 15, 2019

(86) PCT No.: PCT/CN2019/111256
§ 371 (c)(1),
(2) Date: Apr. 14, 2022

(87) PCT Pub. No.: WO2021/072636
PCT Pub. Date: Apr. 22, 2021

(65) Prior Publication Data
US 2023/0370314 A1     Nov. 16, 2023

(51) Int. Cl.
H04K 1/10          (2006.01)
H04L 27/26        (2006.01)
(Continued)

(52) U.S. Cl.
CPC ... *H04L 27/26025* (2021.01); *H04W 72/0453* (2013.01); *H04W 74/002* (2013.01); *H04W 74/0833* (2013.01)

(58) Field of Classification Search
CPC ........ H04L 27/26025; H04W 72/0453; H04W 74/002; H04W 56/001; H04W 74/0833
(Continued)

(56) References Cited

U.S. PATENT DOCUMENTS 10,917,916 B2    2/2021  Wang et al.
2007/0159959 A1  7/2007  Song et al.
(Continued)

FOREIGN PATENT DOCUMENTS

CN    110300459 A    1/2019
CN    109565889 A    4/2019
WO    2019031889 A1  2/2019

OTHER PUBLICATIONS

International Search Report of PCT Application No. PCT/CN2019/111256 dated Jun. 24, 2020 with English translation, (4p).
(Continued)

*Primary Examiner* — Phuong Phu
(74) *Attorney, Agent, or Firm* — Arch & Lake LLP

(57) ABSTRACT

A method and an apparatus for configuring a physical random access channel are provided. The method includes: receiving a pattern identifier configured by an access network device, where the pattern identifier configures a first physical resource configuration pattern of the physical random access channel corresponding to a first subcarrier spacing in a frequency domain; determining a second subcarrier spacing of a target cell; and determining a second physical resource configuration pattern of the physical random access channel corresponding to the second subcarrier spacing in the frequency domain according to the pattern identifier and the second subcarrier spacing.

15 Claims, 5 Drawing Sheets

(51) Int. Cl.
  *H04L 27/28*    (2006.01)
  *H04W 72/0453*  (2023.01)
  *H04W 74/00*    (2009.01)
  *H04W 74/0833*  (2024.01)

(58) Field of Classification Search
  USPC ................................ 375/260, 219, 220, 222
  See application file for complete search history.

(56) References Cited

U.S. PATENT DOCUMENTS

2018/0035421 A1*  2/2018  Lin ..................... H04W 56/001
2018/0091267 A1   3/2018  Kim et al.
2018/0097672 A1   4/2018  Jung et al.
2019/0274172 A1   9/2019  Yoon et al.

OTHER PUBLICATIONS

INOA issued in Application No. 202247027194, dated Sep. 20, 2022, with English translation, (6p).
The extended European search report issued in Application No. 19949333.9, dated Sep. 28, 2022, (10p).
LG Electronics, "Physical layer design of initial access signals and channels for NR-U", 3GPP Tsg Ran WG1 #98bis, R1-1910816, Chongqing, China, Oct. 14-20, 2019, (17p).
Xiaomi, "On NR-U initial access signals/channels", 3GPP TSG RAN WG1 #98b, R1-1911292, Chongqing, China, Oct. 14-20, 2019, (4p).

* cited by examiner

METHOD AND APPARATUS FOR CONFIGURING PHYSICAL RANDOM ACCESS CHANNEL

CROSS-REFERENCE TO RELATED APPLICATION

This application is the U.S. national phase application of International Application No. PCT/CN2019/111256, filed on Oct. 15, 2019, the entire contents of which are incorporated herein by reference for all purposes.

TECHNICAL FIELD

The disclosure relates to the field of communication technology, in particular to a method and an apparatus for configuring a physical random access channel, a terminal and a storage medium.

BACKGROUND

With the development of communication technology, the 5G New Radio Unlicensed Spectrum (NR-U) project has received more and more attention. The design of unlicensed spectrum should comply with relevant regulations in major regions of the world, including the relevant requirements for Occupied Channel Bandwidth (OCB): the transmission bandwidth of the transmitted signal should occupy a certain preset proportion of the system bandwidth.

Currently, the initial access bandwidth defined by NR-U is 48 physical resource blocks (PRBs), which is close to 20 M for 30K subcarrier spacing. In the configuration of the Physical Random Access Channel (PRACH), the 30K subcarrier spacing corresponds to a physical resource configuration pattern, so that the occupied bandwidth is slightly greater than the initial access bandwidth to meet the OCB requirement.

The solution proposed in the related art is only for the 30K subcarrier spacing. For other subcarrier spacings, the physical resource configuration patterns corresponding to other subcarrier spacings are not specified, and there are many possibilities for the physical resource configuration patterns corresponding to other subcarrier spacings, which cannot solve the problem of the configuration of the physical random access channel well.

SUMMARY

According to a first aspect of the present disclosure, a method for configuring a physical random access channel is provided. The method includes:
- receiving a pattern identifier configured by an access network device, where the pattern identifier configures a first physical resource configuration pattern of the physical random access channel corresponding to a first subcarrier spacing in a frequency domain;
- determining a second subcarrier spacing of a target cell; and
- determining a second physical resource configuration pattern of the physical random access channel corresponding to the second subcarrier spacing in the frequency domain according to the pattern identifier and the second subcarrier spacing.

According to a second aspect of the present disclosure, a terminal is provided. The terminal includes: a processor; a transceiver connected to the processor; and a memory configured to store instructions executable by the processor. Further, the processor is configured to implement the method for configuring a physical random access channel described in the above aspect by loading and executing the instructions.

According to a third aspect of the present disclosure, a non-transitory computer-readable storage medium is provided. The readable storage medium is stored thereon with executable instructions. The executable instructions are configured to be loaded and executed by a processor to implement the method for configuring a physical random access channel described in the above aspect.

BRIEF DESCRIPTION OF THE DRAWINGS

In order to illustrate the technical solutions in embodiments of the present disclosure more clearly, the following briefly introduces the accompanying drawings used in the description of embodiments. Obviously, the accompanying drawings in the following description are only some embodiments of the present disclosure. For those of ordinary skill in the art, other drawings can also be obtained from these drawings without creative effort.

DETAILED DESCRIPTION

In order to make the objectives, technical solutions and advantages of the present disclosure clearer, embodiments of the present disclosure will be further described in detail below with reference to the accompanying drawings.

Figures 1, 2:
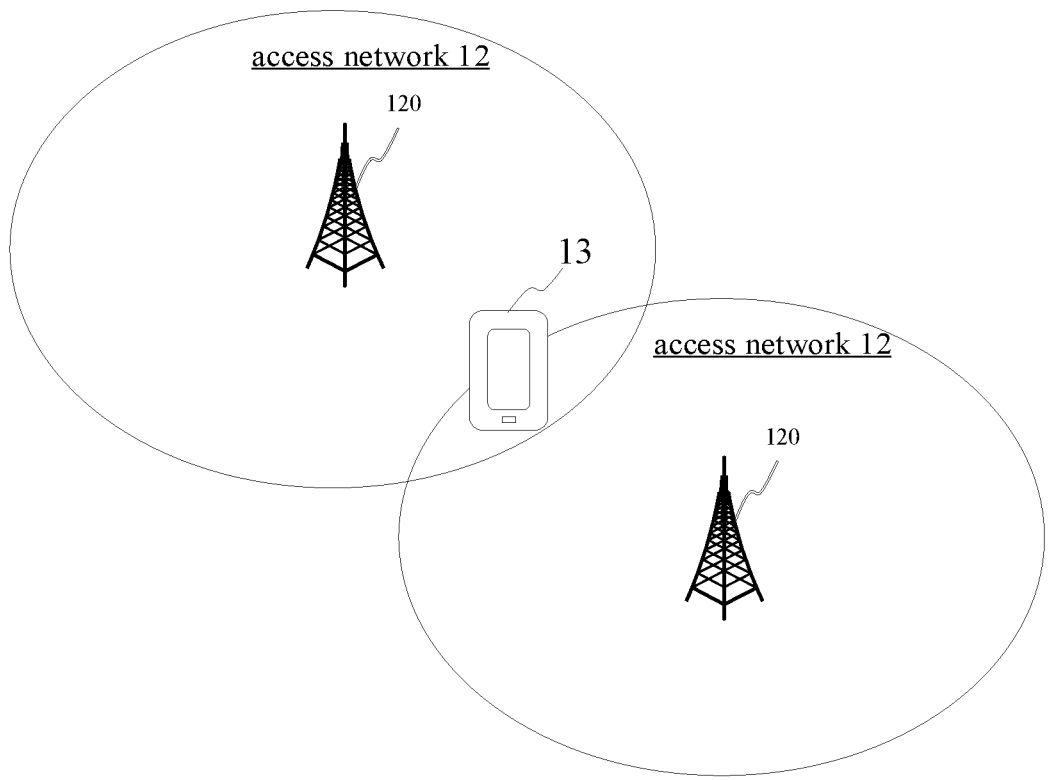
FIG. 1 is a schematic diagram of a communication system according to an example embodiment.
FIG. 2 is a flowchart of a method for configuring a physical random access channel provided by an example embodiment.

FIG. 1 shows a schematic diagram of a communication system provided by an example embodiment of the present disclosure. The communication system operates in an unlicensed frequency band. The communication system may include: an access network 12 and a terminal 13.

The access network 12 includes several access network devices 120. The access network device 120 may be a base station, and the base station is a device deployed in an access network to provide a wireless communication function for a terminal. The base station may include various forms of macro base station, micro base station, relay station, access point and so on. In the 5G NR-U system, the device with base station function is called gNodeB or gNB. As communication technology evolves, the description of "base station" may change.

The terminal 13 may include various handheld devices with wireless communication functions, vehicle-mounted devices, wearable devices, computing devices or other processing devices connected to the wireless modem, as well as various forms of user equipment, mobile stations (MS), terminal devices and so on. For the convenience of description, the devices mentioned above are collectively referred to as terminals. The access network device 120 and the terminal 13 communicate with each other through a certain air interface technology, such as a Uu interface.

It should be noted that the following example embodiments of the present disclosure only take a terminal accessing an access network device as an example for illustration. After understanding the technical solutions of the present disclosure, those skilled in the art will easily think of applying the method for configuring the physical random access channel to the method for configuring other physical random access channels evolved later, and to the case where other terminals access other access network devices, and these extended schemes should be included in the protection scope of the present disclosure.

FIG. 2 shows a flowchart of a method for configuring a physical random access channel provided by an example embodiment of the present disclosure, which is applied to a terminal. The method includes followings.

In step 201, a pattern identifier configured by an access network device is received, where the pattern identifier is configured to configure a first physical resource configuration pattern of a physical random access channel corresponding to a first subcarrier spacing in a frequency domain.

The access network device is a device that provides wireless communication functions for terminals in an access network. Alternatively, the terminal establishes a communication connection with the access network, and receives the pattern identifier configured by the access network device.

The function and process of establishing the communication connection between the terminal in an idle state or an inactive state and the access network is usually a request to establish a connection, which is called random access. In the process of random access, the terminal sends a physical random channel, also called a preamble, to the access network device.

In the time domain, a slot is the basic unit of scheduling. The time lengths of different slots correspond to different subcarrier spacings in the frequency domain.

Alternatively, the time length of the slot is 1 millisecond, and at this time, the subcarrier spacing is 15 kHz.

Alternatively, the time length of the slot is 0.5 milliseconds, and at this time, the subcarrier spacing is 30 kHz.

Alternatively, the time length of the slot is 0.25 milliseconds, and at this time, the subcarrier spacing is 60 kHz.

Alternatively, the time length of the slot is 0.125 milliseconds, and at this time, the subcarrier spacing is 120 kHz.

The first subcarrier spacing is any one of the foregoing subcarrier spacings, which is not limited in the present disclosure. Different subcarrier spacings correspond to different physical resource configuration patterns.

Alternatively, the physical resources include frequency domain resources. The physical resource configuration pattern is a pattern corresponding to the configuration of frequency domain resources.

The pattern identifier is an identifier for configuring the first physical resource configuration pattern corresponding to the first subcarrier spacing.

In step 202, a second subcarrier spacing of a target cell is determined.

A subcarrier spacing type is part of the random access configuration of the cell, and the target cell corresponds to the second subcarrier spacing.

The target cell is a cell configured by the access network device for the terminal during the cell handover process of the terminal; or, the target cell is a cell accessed during the initial network access process after the terminal is initially powered on.

In an example, determining the second subcarrier spacing of the target cell includes: receiving a Sub-Carrier Space (SCS) identifier configured by the access network device for the target cell, where the SCS identifier is configured to indicate the second subcarrier spacing; or, determining the second subcarrier spacing predefined by the target cell.

TABLE 1

| SCS identifier | |
| --- | --- |
| μ | $\Delta f = 2^\mu \cdot 15$ [kHz] |
| 0 | 15 |
| 1 | 30 |
| 2 | 60 |
| 3 | 120 |
| 4 | 240 |

As shown in Table 1, the SCS identifier is configured to indicate the second subcarrier spacing. For example, if the terminal receives the SCS identifier configured by the access network device for the target cell as 1, the second subcarrier spacing is 30 kHz; if the terminal receives the SCS identifier configured by the access network device for the target cell as 2, then the second subcarrier spacing is 60 kHz.

It should be noted that the frequency of the second subcarrier spacing is different from that of the first subcarrier spacing.

The terminal determines the second subcarrier spacing of the target cell by receiving the SCS identifier configured by the access network device for the target cell, or receiving the second sub carrier spacing predefined by the target cell.

In step 203, a second physical resource configuration pattern of the physical random access channel corresponding to the second subcarrier spacing in the frequency domain is determined according to the pattern identifier and the second subcarrier spacing.

The second physical resource configuration pattern is a physical resource configuration pattern corresponding to the second subcarrier spacing.

Alternatively, the terminal determines the first physical resource configuration pattern corresponding to the first subcarrier spacing according to the pattern identifier; and determines a multiple relationship between the first subcarrier spacing and the second subcarrier spacing according to the second subcarrier spacing. According to the above two pieces of information, the second physical resource configuration pattern of the physical random access channel corresponding to the second subcarrier spacing in the frequency domain is determined.

In an example, a physical bandwidth occupied by the physical random access channel is fixed, that is, frequency domain bandwidth occupied by the first physical resource configuration pattern and the second physical resource configuration pattern is the same; and relative positions occupied by the first and second physical resource configuration patterns in the frequency domain bandwidth are the same.

The same relative position means that when the frequency domain bandwidth is fixed, the first physical resource configuration pattern and the second physical resource configuration pattern have the same length in the frequency domain bandwidth and the same offset from the start position of the frequency domain bandwidth.

Figure 3:
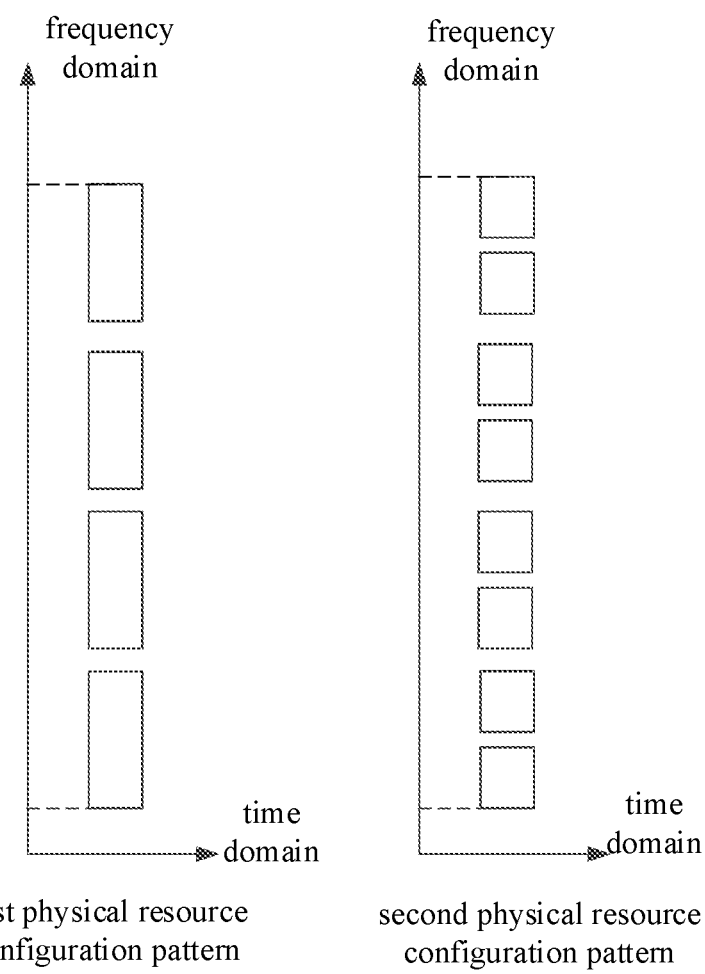
FIG. 3 is a flowchart of a method for configuring a physical random access channel provided by an example embodiment.

For example, as shown in FIG. 3, the first subcarrier spacing corresponding to the first physical resource configuration pattern is 30 kHz, and the second subcarrier spacing corresponding to the second physical resource configuration pattern is 15 kHz. The frequency domain bandwidth occupied by the first physical resource configuration pattern and the second physical resource configuration pattern is the same. The first physical resource configuration pattern occupies a certain position in the frequency domain bandwidth, and the second physical resource configuration pattern also occupies a certain position in the frequency domain bandwidth. The relative positions occupied by the first physical resource configuration pattern and the second physical resource configuration pattern in the frequency domain bandwidth are the same.

In one example, the first subcarrier spacing is one of 15 kHz, 30 kHz, and 60 kHz, and the second subcarrier spacing is the other of 15 kHz, 30 kHz, and 60 kHz.

It should be noted that, with the development of communication standards, the first subcarrier spacing and the second subcarrier spacing include but are not limited to the above-mentioned ones, which are not limited in the present disclosure.

In conclusion, with the method provided in this embodiment, by setting the pattern identifier for the subcarrier spacing of one frequency, and configuring the physical resource configuration pattern corresponding to the subcarrier spacing of another frequency according to the pattern identifier, there is no need to configure different subcarriers independently, which simplifies the method for configuring the physical random access channel with respect to different sub carriers.

Figure 4:
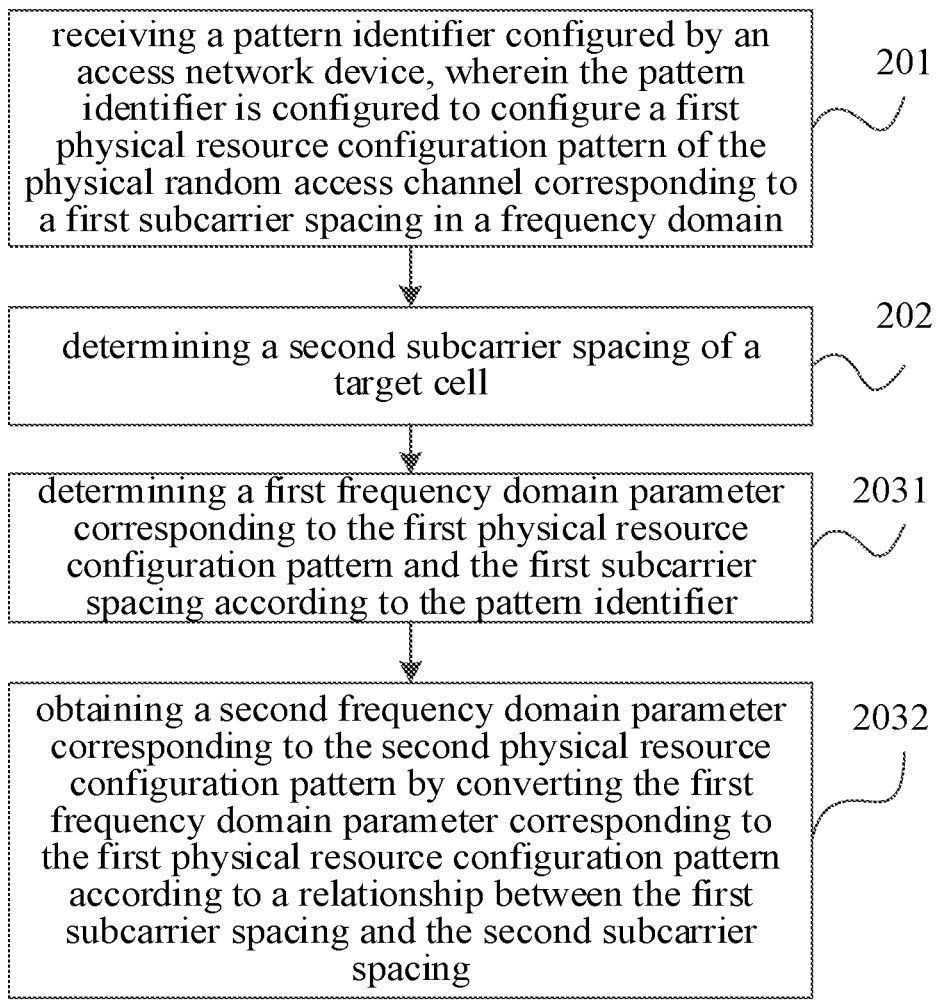
FIG. 4 is a flowchart of a method for configuring a physical random access channel provided by an example embodiment.

In an alternative embodiment based on FIG. 2, FIG. 4 shows a method for configuring a physical random access channel provided by an example embodiment of the present disclosure, applied to a terminal. In this embodiment, step 203 in the above embodiment may be replaced by steps 2031 and 2032. The method includes following steps.

In step 201, a pattern identifier configured by an access network device is received, where the pattern identifier is configured to configure a first physical resource configuration patter corresponding to a first subcarrier spacing of a physical random access channel in the frequency domain.

In step 202, a second subcarrier spacing of a target cell is determined.

In step 2031, a first frequency domain parameter corresponding to the first physical resource configuration pattern and the first subcarrier spacing is determined according to the pattern identifier.

The first frequency domain parameter includes at least one of the following parameters: a number of PRBs occupied by the first physical resource configuration pattern, a number of repetitions of a physical random access channel sequence sent in the first physical resource configuration pattern, a first position occupied by the physical random access channel sequences sent in the first physical resource configuration pattern in the frequency domain bandwidth.

The physical random access channel is generated based on the physical random access channel sequence (preamble sequence) $P_0, P_1, \ldots, P_{L-1}$ of the length L. Alternatively, the physical random access channel sequence is based on the Zadoff-CHU sequence.

Take L=139 as an example, the physical random access channel sequence of the length 139 corresponds to 12 PRBs, i.e., 144 subcarriers. It should be noted that the physical random access channel generated based on the physical random access channel sequence of the length L always occupies 12 PRBs on the frequency domain, no matter what the value of the subcarrier spacing is.

As shown in FIG. 3, the first subcarrier spacing is 30 kHz as an example. Since the system bandwidth is 20 M, the corresponding number of subcarriers is 600, which occupies about 18 M, with both ends having a 1 M protection band. One PRB consists of 12 subcarriers, so the number of PRBs occupied by the first physical resource configuration pattern is 50. The number of repetitions of the physical random access channel sequence sent in the first physical resource configuration pattern is 4.

In step 2032, a second frequency domain parameter corresponding to the second physical resource configuration pattern is obtained by converting the first frequency domain parameter corresponding to the first physical resource configuration pattern according to the relationship between the first subcarrier spacing and the second subcarrier spacing.

The second frequency domain parameter includes at least one of the following parameters: a number of PRBs occupied by the second physical resource configuration pattern, a number of repetitions of a physical random access channel sequence sent in the second physical resource configuration pattern, a second position occupied by the physical random access channel sequences sent in the second physical resource configuration pattern in the frequency domain bandwidth.

The relationship between the first subcarrier spacing and the second subcarrier spacing refers to the multiple relationship between the two subcarrier spacings.

As shown in FIG. 3, taking the second subcarrier spacing as 15 KHz as an example, the relationship between the first subcarrier spacing and the second subcarrier spacing is that the first subcarrier spacing is twice the frequency of the second subcarrier spacing. Since the system bandwidth is 20 M, the corresponding number of subcarriers is 1200, which occupies about 18 M, and two ends each have a 1 M protection band. One PRB consists of 12 subcarriers, so the number of PRBs occupied by the second physical resource configuration pattern is 100. The number of repetitions of the physical random access channel sequence sent in the second physical resource configuration pattern is 8.

In one example, the first subcarrier spacing is equal to $2^n$ times the second subcarrier spacing. The pattern identifier indicates the first physical resource configuration pattern configured for the first subcarrier spacing, and the pattern identifier indicates the second physical resource configuration pattern configured for the second subcarrier spacing. The number of PRBs occupied by the first physical resource configuration pattern is $½^n$ times the number of PRBs occupied by the second physical resource configuration pattern. A first number of physical random access channel sequences sent in the first physical resource configuration pattern is $½^n$ times a second number of physical random access channel sequences sent in the second physical resource configuration pattern.

It should be noted that n is a negative integer or positive integer.

As shown in FIG. 3, taking the first subcarrier spacing being 60 KHz and the second subcarrier spacing being 15 KHz as an example, the relationship between the first subcarrier spacing and the second subcarrier spacing is that the frequency of the first subcarrier spacing is 4 times, i.e., $2^n$ (n=2) times, the frequency of the second subcarrier spacing.

Since the system bandwidth is 20 M, the number of subcarriers corresponding to the first subcarrier spacing is 300, and the number of subcarriers corresponding to the second subcarrier spacing is 1200, which occupies about 18 M, with both ends each having a 1 M protection band. One PRB consists of 12 subcarriers, so the number of PRBs occupied by the first physical resource configuration pattern is 25, and the number of PRBs occupied by the second physical resource configuration pattern is 100. The number of PRBs occupied by the first physical resource configuration pattern is $\frac{1}{2}^n$ (n=2) times the number of PRBs occupied by the second physical resource configuration pattern.

The number of repetitions of the physical random access channel sequence sent in the first physical resource configuration pattern is 2, and the number of repetitions of the physical random access channel sequence sent in the second physical resource configuration pattern is 8. The first number of physical random access channel sequences sent in the first physical resource configuration pattern is $\frac{1}{2}^n$ (n=2) times the second number of physical random access channel sequences sent in the second physical resource configuration pattern.

In summary, with the method provided by this embodiment, the second frequency domain parameter corresponding to the second physical resource configuration pattern is obtained by converting the first frequency domain parameter corresponding to the first physical resource configuration pattern according to the relationship between the first subcarrier spacing and the second subcarrier spacing, without the need to reconfigure the second frequency domain parameter individually, which simplifies the method for configuring the physical random access channel with respect to different subcarriers.

In an alternative embodiment based on FIG. 2 and FIG. 4, a first position in the frequency domain bandwidth occupied by the physical random access channel sequences sent in the first physical resource configuration pattern includes at least two frequency domain units. The at least two frequency domain units have a one-to-one correspondence with the physical random access channel sequences, and the physical random access channel sequence sent in each frequency domain unit is repeated. The at least two frequency domain units are in an axis-symmetric pattern according to the symmetry axis, and transmission positions of the random access channel sequences in the at least two frequency domain units are aligned on both sides, aligned in the center or aligned on one side according to the symmetry axis.

Figure 5:
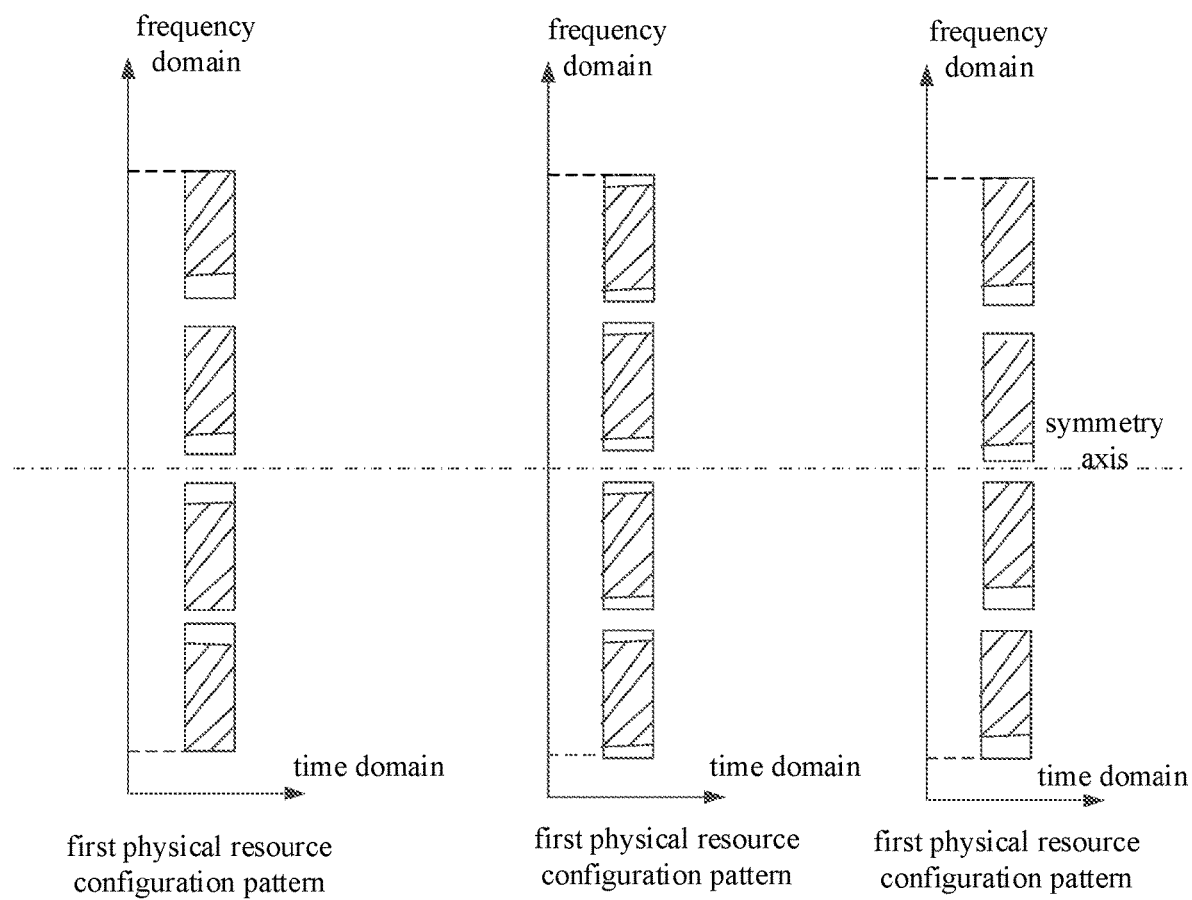
FIG. 5 is a flowchart of a method for configuring a physical random access channel provided by an example embodiment.

As shown in FIG. 5, the first subcarrier spacing is 30 KHz and the length of the physical random access channel sequence is 139 as an example for illustration. The first position occupied by the physical random access channel sequences sent in the first physical resource configuration pattern in the frequency domain bandwidth includes four frequency domain units. Four frequency domain units correspond to four physical random access channel sequences, that is, each frequency domain unit corresponds to one physical random access sequence.

The physical random access channel sequences sent in each frequency domain unit is repeated, that is, the physical random access channel sequences sent in each frequency domain unit are the same.

FIG. 5 shows the situation of the transmission positions of the physical random access channel sequences in the at least two frequency domain units.

1. The transmission positions of the physical random access channel sequences in at least two frequency domain units are aligned on both sides according to the symmetry axis.

The symmetry axis is between the second frequency domain unit and the third frequency domain unit of the 4 frequency domain units.

In the two frequency domain units with the frequency domain position at the upper part, the transmission position of the physical random access channel sequence with a length of 139 in the frequency domain unit is at the upper part in the frequency domain unit. In the two frequency domain units with the frequency domain position at the lower part, the transmission position of the physical random access channel sequence with a length of 139 in the frequency domain unit is at the lower part in the frequency domain unit. The transmission positions of the physical random access channel sequences in the four frequency domain units are aligned on both sides according to the symmetry axis.

2. The transmission positions of the physical random access channel sequences in the at least two frequency domain units are aligned in the center according to the symmetry axis.

The symmetry axis is between the second frequency domain unit and the third frequency domain unit of the 4 frequency domain units.

In the four frequency domain units, the transmission position of the physical random access channel sequence with a length of 139 in the frequency domain unit is in the middle of the frequency domain unit. The transmission positions of the physical random access channel sequences in the four frequency domain units are aligned in the center according to the symmetry axis.

3. The transmission positions of the physical random access channel sequences in at least two frequency domain units are aligned on one side.

In the four frequency domain units, the transmission position of the physical random access channel sequence with a length of 139 in the frequency domain unit is in the upper part of the frequency domain unit. The transmission positions of the physical random access channel sequences in the four frequency domain units are aligned on one side according to the symmetry axis.

In one example, the at least two frequency domain units include four frequency domain units at the same time domain position, and the four frequency domain units are uniformly distributed within the frequency domain bandwidth and occupy at least a preset proportion of the frequency domain bandwidth; or, the at least two frequency domain units include two frequency domain units with the same time domain position, and the two frequency domain units are distributed at both ends according to the symmetry axis in the frequency domain bandwidth and occupy at least a preset proportion of the frequency domain bandwidth.

Alternatively, the frequency domain bandwidth is 20 M.

Alternatively, the preset proportion is 80%, that is, the transmission bandwidth of the transmitted signal is required to occupy more than 80% of the frequency domain bandwidth.

Figure 6:
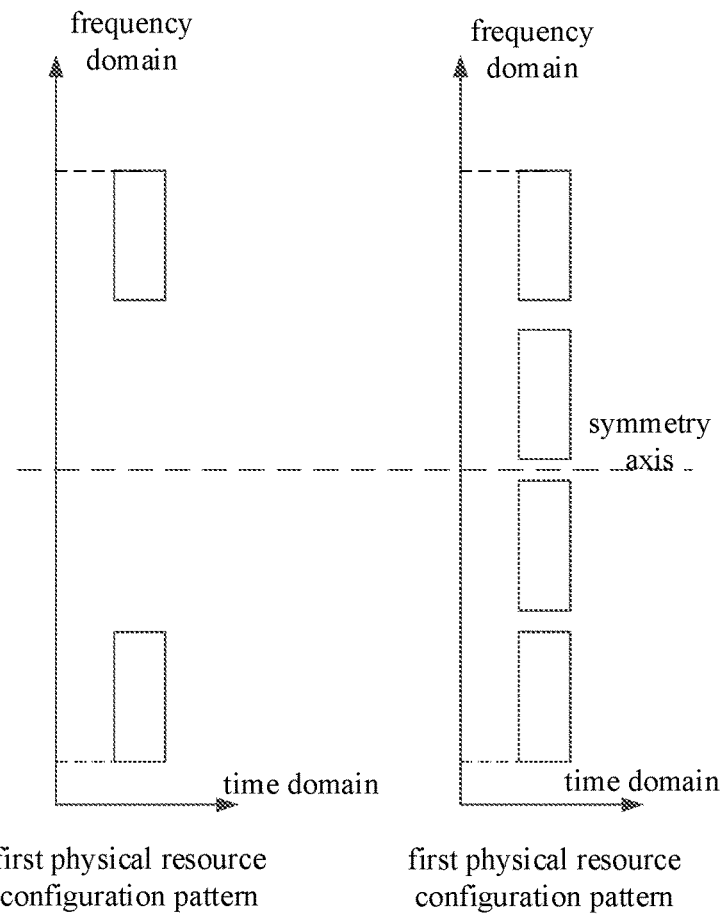
FIG. 6 is a flowchart of a method for configuring a physical random access channel provided by an example embodiment.

As shown in FIG. 6, the first subcarrier spacing is 30 KHz and the length of the physical random access channel sequence is 139 as an example for illustration. The first position occupied by the physical random access channel sequences sent in the first physical resource configuration pattern in the frequency domain bandwidth includes four frequency domain units. The four frequency domain units correspond to four physical random access channel sequences, that is, each frequency domain unit corresponds to one physical random access sequence.

1. The at least two frequency domain units include two frequency domain units at the same time domain position, and the two frequency domain units are distributed at both ends according to the symmetry axis within the frequency domain bandwidth and occupy at least a preset proportion of the frequency domain bandwidth.

As shown in FIG. 6, the symmetry axis is located in the middle of the frequency domain bandwidth.

The two frequency domain units are distributed at both ends according to the symmetry axis in the frequency domain bandwidth, that is, one frequency domain unit is distributed at the head of the frequency domain bandwidth, and one frequency domain unit is distributed at the tail of the frequency domain bandwidth.

The two frequency domain units occupy at least 80% of the frequency domain bandwidth.

2. The at least two frequency domain units include four frequency domain units with the same time domain position, and the four frequency domain units are evenly distributed in the frequency domain bandwidth and occupy at least a preset proportion of the frequency domain bandwidth.

As shown in FIG. 6, the four frequency domain units are evenly distributed in the frequency domain bandwidth, that is, the four frequency domain units are equally spaced and distributed in the frequency domain bandwidth.

The four frequency domain units occupy at least 80% of the frequency domain bandwidth.

Figure 7:
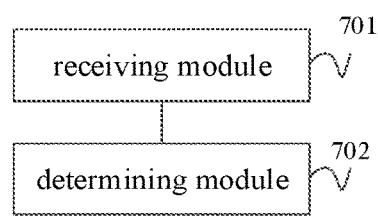
FIG. 7 is a block diagram of an apparatus for configuring a physical random access channel provided by an example embodiment.

FIG. 7 shows a block diagram of an apparatus for transmitting wireless signals provided by an example embodiment of the present disclosure. The apparatus includes: a receiving module 701 and a determining module 702.

The receiving module 701 is configured to receive a pattern identifier configured by an access network device, where the pattern identifier is configured to configure a first physical resource configuration pattern of a physical random access channel corresponding to a first subcarrier spacing in the frequency domain.

The determining module 702 is configured to determine a second subcarrier spacing of a target cell.

The determining module 702 is configured to determine, according to the pattern identifier and the second subcarrier spacing, a second physical resource configuration pattern of the physical random access channel corresponding to the second subcarrier spacing in the frequency domain.

In an example, a physical bandwidth occupied by the physical random access channel is fixed, that is, a frequency domain bandwidth occupied by the first physical resource configuration pattern is the same as a frequency domain bandwidth occupied by the second physical resource configuration pattern; and relative positions occupied by the first physical resource configuration pattern and the second physical resource configuration pattern in the frequency domain bandwidth are the same.

In an example, the determining module 702 is configured to determine a first frequency domain parameter corresponding to the first subcarrier spacing and the first physical resource configuration pattern according to the pattern identifier. The determining module 702 is configured to obtain a second frequency domain parameter corresponding to the second physical resource configuration pattern by converting the first frequency domain parameter corresponding to the first physical resource configuration pattern according to a relationship between the first subcarrier spacing and the second subcarrier spacing.

In an example, the first frequency domain parameter includes at least one of the following parameters: a number of physical resource blocks (PRBs) occupied by the first physical resource configuration pattern, a number of repetitions of the physical random access channel sequence sent in the first physical resource configuration pattern, a first position in the frequency domain bandwidth occupied by the physical random access channel sequences sent in the first physical resource configuration pattern; the second frequency domain parameter includes at least one of the following parameters: a number of PRBs occupied by the second physical resource configuration pattern, a number of repetitions of the physical random access channel sequence sent in the second physical resource configuration pattern, and a second position occupied by the physical random access channel sequences sent in the second physical resource configuration pattern in the frequency domain bandwidth.

In an example, the first subcarrier spacing is equal to $2^n$ times the second subcarrier spacing; the pattern identifier indicates the first physical resource configuration pattern configured for the first subcarrier spacing; the number of PRBs occupied by the first physical resource configuration pattern is $\frac{1}{2}^n$ times the number of PRBs occupied by the second physical resource configuration pattern; the first number of physical random access channel sequences sent in the first physical resource configuration pattern is $\frac{1}{2}^n$ times the second number of the physical random access channel sequences sent in the second physical resource configuration pattern.

In an example, the first position in the frequency domain bandwidth occupied by the physical random access channel sequences sent in the first physical resource configuration pattern includes at least two frequency domain units. The at least two frequency domain units are in a one-to-one correspondence with the physical random access channel sequences, and the physical random access channel sequences sent in each frequency domain unit are repeated. The at least two frequency domain units are in an axis-symmetric pattern according to the symmetry axis, and the transmission positions of the physical random access channel sequences in the at least two frequency domain units are aligned on both sides, in the center, or on one side according to the symmetry axis.

In an example, the at least two frequency domain units include four frequency domain units at the same time domain position, and the four frequency domain units are uniformly distributed within the frequency domain bandwidth and occupy at least a preset proportion of the frequency domain bandwidth; or, the at least two frequency domain units include two frequency domain units at the same time domain position, and the two frequency domain units are distributed at both ends according to the symmetry axis in the frequency domain bandwidth and occupy at least a preset proportion of the frequency domain bandwidth.

In an example, the first subcarrier spacing is one of 15 kHz, 30 kHz, 60 kHz, and the second subcarrier spacing is the other of 15 kHz, 30 kHz, 60 kHz.

In an example, the receiving module 701 is configured to receive the subcarrier SCS identifier configured by the access network device for the target cell, where the SCS identifier is used to indicate the second subcarrier spacing; or, the determining module 702 is configured to determine the target cell Predefined second subcarrier spacing.

Figure 8:
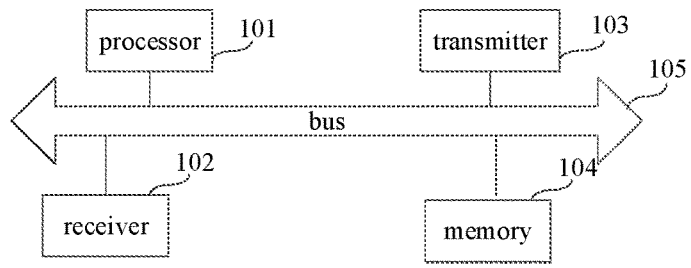
FIG. 8 is a block diagram of a communication device provided by an example embodiment.

FIG. 8 shows a schematic diagram of a terminal provided by an example embodiment of the present disclosure. The terminal includes: a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, which may be a communication chip.

The memory 104 is connected to the processor 101 through the bus 105.

The memory 104 may be configured to store at least one instruction, and the processor 101 may be configured to execute the at least one instruction, so as to implement various steps in the foregoing method embodiments.

In addition, the memory 104 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM).

In an example embodiment, a computer-readable storage medium is also provided, wherein the computer-readable storage medium stores at least one instruction, at least one piece of program, code set or instruction set. The at least one instruction, the at least one piece of program, the code set or the instruction set is loaded and executed by the processor to implement the method for configuring a physical random access channel provided by the above method embodiments and executed by a communication device.

The technical solutions provided by embodiments of the present disclosure include at least the following beneficial effects.

By setting the pattern identifier for the subcarrier spacing of one frequency, and configuring the physical resource configuration pattern corresponding to the subcarrier spacing of another frequency according to the pattern identifier, it is not necessary to configure separately for different subcarriers, which simplifies the method for configuring the physical random access channel with respect to different subcarriers.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above are only alternative embodiments of the present disclosure, and are not intended to limit the present disclosure. Any modifications, equivalent replacements, improvements, or the like made within the spirit and principles of the present disclosure shall be included in the protection scope of the present disclosure.

What is claimed is:

1. A method for configuring a physical random access channel, comprising:
receiving a pattern identifier configured by an access network device, wherein the pattern identifier configures a first physical resource configuration pattern of the physical random access channel corresponding to a first subcarrier spacing in a frequency domain;
determining a second subcarrier spacing of a target cell; and
determining a second physical resource configuration pattern of the physical random access channel corresponding to the second subcarrier spacing in the frequency domain according to the pattern identifier and the second subcarrier spacing;
wherein determining the second physical resource configuration pattern of the physical random access channel corresponding to the second subcarrier spacing in the frequency domain according to the pattern identifier and the second subcarrier spacing comprises:
determining a first frequency domain parameter corresponding to the first physical resource configuration pattern and the first subcarrier spacing according to the pattern identifier; and
obtaining a second frequency domain parameter corresponding to the second physical resource configuration pattern by converting the first frequency domain parameter corresponding to the first physical resource configuration pattern according to a relationship between the first subcarrier spacing and the second subcarrier spacing; wherein the first frequency domain parameter comprises a number of repetitions of a physical random access channel sequence sent in the first physical resource configuration pattern; the second frequency domain parameter comprises a number of repetitions of a physical random access channel sequence sent in the second physical resource configuration pattern.

2. The method of claim 1, wherein
a frequency domain bandwidth occupied by the first physical resource configuration pattern is the same as a frequency domain bandwidth occupied by the second physical resource configuration pattern;
and,
a relative position occupied by the first physical resource configuration pattern in the frequency domain bandwidth is the same as a relative position occupied by the second physical resource configuration pattern in the frequency domain bandwidth.

3. The method of claim 1, wherein the first subcarrier spacing is equal to $2^n$ times the second subcarrier spacing, wherein n is a positive or negative integer; the pattern identifier indicates the first physical resource configuration pattern configured for the first subcarrier spacing;
the number of PRBs occupied by the first physical resource configuration pattern is $½^n$ times the number of PRBs occupied by the second physical resource configuration pattern;
a first number of physical random access channel sequences sent in the first physical resource configuration pattern is $½^n$ times a second number of physical random access channel sequences sent in the second physical resource configuration pattern.

4. The method of claim 1, wherein the first position occupied by the physical random access channel sequences sent in the first physical resource configuration pattern in the frequency domain bandwidth comprises:
at least two frequency domain units, wherein the at least two frequency domain units are in a one-to-one correspondence with the physical random access channel sequences, and the physical random access channel sequence sent in each frequency domain unit is repeated;
wherein the at least two frequency domain units are in an axisymmetric pattern according to a symmetry axis, and transmission positions of the physical random access channel sequences in the at least two frequency domain units are aligned on both sides, in the center or on one side according to the symmetry axis.

5. The method of claim 4, wherein
the at least two frequency domain units comprises four frequency domain units at the same time domain position, and the four frequency domain units are uniformly distributed in the frequency domain bandwidth and occupy at least a preset proportion of the frequency domain bandwidth;
or,
the at least two frequency domain units comprise two frequency domain units at the same time domain position, and the two frequency domain units are distributed at both ends according to the symmetry axis within the frequency domain bandwidth and occupy at least a preset proportion of the frequency domain bandwidth.

6. The method of claim 1, wherein
the first subcarrier spacing is one of 15 kHz, 30 kHz, and 60 kHz, and the second subcarrier spacing is another one of 15 kHz, 30 kHz, and 60 kHz.

7. The method of claim 1, wherein determining the second subcarrier spacing of the target cell comprises:
receiving a subcarrier space (SCS) identifier configured by the access network device for the target cell, wherein the SCS identifier is configured to indicate the second subcarrier spacing;
or,
determining the second subcarrier spacing predefined by the target cell.

8. A terminal, comprising:
a processor;
a transceiver connected to the processor; and
a memory configured to store instructions executable by the processor;
wherein, the processor is configured to:
receive a pattern identifier configured by an access network device, wherein the pattern identifier configures a first physical resource configuration pattern of the physical random access channel corresponding to a first subcarrier spacing in a frequency domain;
determine a second subcarrier spacing of a target cell; and
determine a second physical resource configuration pattern of the physical random access channel corresponding to the second subcarrier spacing in the frequency domain according to the pattern identifier and the second subcarrier spacing;
wherein the processor is further configured to:
determine a first frequency domain parameter corresponding to the first physical resource configuration pattern and the first subcarrier spacing according to the pattern identifier; and
obtain a second frequency domain parameter corresponding to the second physical resource configuration pattern by converting the first frequency domain parameter corresponding to the first physical resource configuration pattern according to a relationship between the first subcarrier spacing and the second subcarrier spacing; wherein the first frequency domain parameter comprises a number of repetitions of a physical random access channel sequence sent in the first physical resource configuration pattern; the second frequency domain parameter comprises a number of repetitions of a physical random access channel sequence sent in the second physical resource configuration pattern.

9. A non-transitory computer-readable storage medium, stored thereon with executable instructions, wherein the executable instructions are configured to be loaded and executed by a processor to implement acts comprising:
receiving a pattern identifier configured by an access network device, wherein the pattern identifier configures a first physical resource configuration pattern of a physical random access channel corresponding to a first subcarrier spacing in a frequency domain;
determining a second subcarrier spacing of a target cell; and
determining a second physical resource configuration pattern of the physical random access channel corresponding to the second subcarrier spacing in the frequency domain according to the pattern identifier and the second subcarrier spacing;
wherein determining the second physical resource configuration pattern of the physical random access channel corresponding to the second subcarrier spacing in the frequency domain according to the pattern identifier and the second subcarrier spacing comprises:
determining a first frequency domain parameter corresponding to the first physical resource configuration pattern and the first subcarrier spacing according to the pattern identifier; and
obtaining a second frequency domain parameter corresponding to the second physical resource configuration pattern by converting the first frequency domain parameter corresponding to the first physical resource configuration pattern according to a relationship between the first subcarrier spacing and the second subcarrier spacing; wherein the first frequency domain parameter comprises a number of repetitions of a physical random access channel sequence sent in the first physical resource configuration pattern; the second frequency domain parameter comprises a number of repetitions of a physical random access channel sequence sent in the second physical resource configuration pattern.

10. The terminal of claim 8, wherein
a frequency domain bandwidth occupied by the first physical resource configuration pattern is the same as a frequency domain bandwidth occupied by the second physical resource configuration pattern;
and,
a relative position occupied by the first physical resource configuration pattern in the frequency domain bandwidth is the same as a relative position occupied by the second physical resource configuration pattern in the frequency domain bandwidth.

11. The terminal of claim 8, wherein the first subcarrier spacing is equal to $2^n$ times the second subcarrier spacing, wherein n is a positive or negative integer; the pattern identifier indicates the first physical resource configuration pattern configured for the first subcarrier spacing;
the number of PRBs occupied by the first physical resource configuration pattern is $\frac{1}{2}^n$ times the number of PRBs occupied by the second physical resource configuration pattern;
a first number of physical random access channel sequences sent in the first physical resource configuration pattern is $\frac{1}{2}^n$ times a second number of physical random access channel sequences sent in the second physical resource configuration pattern.

12. The terminal of claim 8, wherein the first position occupied by the physical random access channel sequences sent in the first physical resource configuration pattern in the frequency domain bandwidth comprises:

at least two frequency domain units, wherein the at least two frequency domain units are in a one-to-one correspondence with the physical random access channel sequences, and the physical random access channel sequence sent in each frequency domain unit is repeated;

wherein the at least two frequency domain units are in an axisymmetric pattern according to a symmetry axis, and transmission positions of the physical random access channel sequences in the at least two frequency domain units are aligned on both sides, in the center or on one side according to the symmetry axis.

13. The terminal of claim 12, wherein
the at least two frequency domain units comprises four frequency domain units at the same time domain position, and the four frequency domain units are uniformly distributed in the frequency domain bandwidth and occupy at least a preset proportion of the frequency domain bandwidth;

or, the at least two frequency domain units comprise two frequency domain units at the same time domain position, and the two frequency domain units are distributed at both ends according to the symmetry axis within the frequency domain bandwidth and occupy at least a preset proportion of the frequency domain bandwidth.

14. The terminal of claim 8, wherein
the first subcarrier spacing is one of 15 kHz, 30 kHz, and 60 kHz, and the second subcarrier spacing is another one of 15 kHz, 30 kHz, and 60 kHz.

15. The terminal of claim 8, wherein the processor is configured to:

receive a subcarrier spacing (SCS) identifier configured by the access network device for the target cell, wherein the SCS identifier is configured to indicate the second subcarrier spacing;

or, determine the second subcarrier spacing predefined by the target cell.

* * * * *